US012489479B2

(12) United States Patent
Bucceri et al.

(10) Patent No.: US 12,489,479 B2
(45) Date of Patent: Dec. 2, 2025

(54) POWER COMBINING FOR HIGH POWER AMPLIFIERS

(71) Applicant: BAE Systems Information and Electronic Systems Integration Inc., Nashua, NH (US)

(72) Inventors: John Bucceri, Londonderry, NH (US); Bernard J. Schmanski, Merrimack, NH (US); Douglas M. Dugas, Chelmsford, NH (US); Patrick D. McKivergan, Londonderry, NH (US); Michael Patrick Doran, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 398 days.

(21) Appl. No.: 18/360,409

(22) Filed: Jul. 27, 2023

(65) Prior Publication Data
US 2025/0038779 A1 Jan. 30, 2025

(51) Int. Cl.
*H04B 1/38* (2015.01)
*H04B 1/04* (2006.01)
*H04B 1/10* (2006.01)

(52) U.S. Cl.
CPC ............ *H04B 1/1009* (2013.01); *H04B 1/04* (2013.01)

(58) Field of Classification Search
CPC ............. H04B 1/04; H04B 2001/0408; H04B 2001/045; H04B 1/0458; H04B 1/1009
See application file for complete search history.

(56) References Cited

U.S. PATENT DOCUMENTS 7,113,056 B2   9/2006  Wu et al.
8,319,583 B2   11/2012  Huettner
(Continued)

FOREIGN PATENT DOCUMENTS

EP   0926762   6/1999
EP   2433333   7/2017
(Continued)

OTHER PUBLICATIONS

Michael Patrick Doran, Power Combiner Network for Solid State High Power Amplification, Final Project Paper—M.S. ECE Industrial Degree Program, presented Nov. 2017 to a small group of individuals at the University of Massachusetts and submitted Dec. 2017 to the University of Massachusetts for review but is unknown if it has. Been published or made available to the public.

*Primary Examiner* — Tuan Pham
(74) *Attorney, Agent, or Firm* — Sand, Sebolt & Wernow LPA

(57) ABSTRACT

An ultra-wideband radio frequency (RF) apparatus for combining and/or dividing RF signals. RF apparatus includes a circuit board, a communication cable that operably engages with the circuit board, at least two transmission lines that are formed on the circuit board and operably engages with the communication cable, and at least two connectors that operably engages with the at least two transmission lines. The RF apparatus is operable in a first configuration and a second configuration. When the RF apparatus is provided in the first configuration, the RF apparatus is operable to divide a first RF signal into at least two RF signals. When the RF apparatus is provided in the second configuration, the RF apparatus is operable to combine the at least two RF signals into a second RF signal. The RF apparatus is capable of achieving a low insertion loss less than 1 dB over a bandwidth greater than 20:1.

20 Claims, 7 Drawing Sheets

(56) References Cited

U.S. PATENT DOCUMENTS

| | | | |
|---|---|---|---|
| 8,482,364 B2 | 7/2013 | Floyd et al. | |
| 9,385,668 B2 | 7/2016 | Blair et al. | |
| 10,340,574 B2 | 7/2019 | Mohan et al. | |
| 10,826,437 B2 | 11/2020 | Nikolayenkov et al. | |
| 12,143,074 B2 * | 11/2024 | Yoon | H01P 3/06 |
| 2012/0075035 A1 * | 3/2012 | Rector | H01P 5/12 |
| | | | 333/136 |
| 2016/0036113 A1 * | 2/2016 | Wu | H03F 3/211 |
| | | | 333/137 |

FOREIGN PATENT DOCUMENTS

| | | |
|---|---|---|
| EP | 3732494 | 7/2021 |
| WO | 2011029720 | 3/2011 |
| WO | 2016060781 | 4/2016 |
| WO | 2022047626 | 3/2022 |

\* cited by examiner

POWER COMBINING FOR HIGH POWER AMPLIFIERS

TECHNICAL FIELD

The present disclosure relates to radial power dividers-combiners that are suitable for use in solid-state power-amplifier modules and/or assemblies.

BACKGROUND ART

Solid-state power-amplifier modules (SSPAs) have a variety of uses in military operations and in civilian operations. In one example, SSPAs may be used in satellites to amplify severely attenuated ground transmissions to a level suitable for processing in the satellite. In another example, SSPAs may also be used to perform the necessary amplification for signals transmitted to other satellites in a crosslink application, or to the earth for reception by ground based receivers. In yet another example, SSPAs may also be suitable for ground-based RF applications requiring high output power for a particular military platform or civilian platform. However, these SSPAs require specific devices and/or apparatuses for amplifying and/or enhancing transmissions, particularly radio frequency (RF) transmissions, emitted by one or more points of interest (POIs).

To meet these requirements, SSPAs may use isolated or radial power dividers-combiners for processing ground transmissions emitted by one or more points of interest (POIs). In one instance, use of isolated combiners may ensure that a return loss at divider-combiner ports of isolated combiners is well behaved when other ports are mismatched due to internal power dissipation resistors. However, this comes at a cost of increased loss relative to a radial combiner which is not isolated but when properly designed proves lower loss and wide operating bandwidth. Currently, conventional SSPA designs may use a radial splitting and combining architecture in which the signal is divided into a number of individual parts. Each individual part is then amplified by a respective amplifier. The outputs of the amplifiers are then combined into a single output that achieves the desired overall signal amplification. However, conventional radial power dividers-combiners used with SSPAs are cumbersome and subject to losses of signal strength when the number of combined amplifiers becomes large inside of a single SSPA. Moreover, these conventional radial power dividers-combiners are rather expensive and are constructed to a particular application due to inherent operating bandwidth limitations, which limits the overall use of these radial power dividers-combiners in other SSPAs.

SUMMARY OF THE INVENTION

In one aspect, an exemplary embodiment of the present disclosure may provide a radio frequency (RF) apparatus. RF apparatus includes a circuit board, a communication cable that operably engages with the circuit board, at least two transmission lines that are formed on the circuit board and operably engages with the communication cable, and at least two connectors that operably engages with the at least two transmission lines. The RF apparatus is operable in a first configuration and a second configuration. When the RF apparatus is provided in the first configuration, the RF apparatus is operable to divide a first RF signal into at least two RF signals. When the RF apparatus is provided in the second configuration, the RF apparatus is operable to combine the at least two RF signals into a second RF signal.

This exemplary embodiment or another exemplary embodiment may further include a first end of the communication cable; and a second end of the communication cable opposite to the first end; wherein when the RF apparatus is operable in the first configuration, the first RF signal divides into the at least two RF signals as the first RF signal is sent from the second end of the communication cable to the at least two transmission lines. This exemplary embodiment or another exemplary embodiment may further include a first end of the communication cable; and a second end of the communication cable opposite to the first end; wherein when the RF apparatus is operable in the second configuration, the at least two RF signals combine into the second RF signal as the at least two RF signals are sent from the at least two transmission lines to the second end of the communication cable. This exemplary embodiment or another exemplary embodiment may further include a bushing operably engaged with the circuit board, the communication cable, and the at least two transmission lines; wherein the bushing provides electrical communication between the communication cable and the at least two transmission lines; and wherein the bushing operably engages the communication cable with the circuit board. This exemplary embodiment or another exemplary embodiment may further include that each transmission line of the at least two transmission lines comprises: a first end operably engaged with the bushing; and a second end operably engaged with a connector of the at least two connectors. This exemplary embodiment or another exemplary embodiment may further include that the circuit board comprises: a first conductive surface; a second conductive surface opposite to the first conductive surface; and a central opening defined in the circuit board that extends between the first conductive surface and the second conductive surface; wherein a portion of the communication cable operably engages with the circuit board inside of the central opening. This exemplary embodiment or another exemplary embodiment may further include that the circuit board further comprises: a peripheral edge defined between the first conductive surface and the second conductive surface; and a set of cooling apertures defined in the circuit board that extends entirely through the circuit board; wherein the set of cooling apertures are defined between the central opening and the peripheral edge to enable air to flow through the circuit board. This exemplary embodiment or another exemplary embodiment may further include that the at least one cooling aperture of the set of cooling apertures is generally triangular-shaped. This exemplary embodiment or another exemplary embodiment may further include that the circuit board further comprises: a set of mounting holes defined in the circuit board that extends entirely through the circuit board; wherein the set of mounting holes are defined between the set of cooling apertures and the peripheral edge. This exemplary embodiment or another exemplary embodiment may further include that the circuit board further comprises: at least two securement holes defined in the circuit board that extends entirely through the circuit board; wherein the at least two securement holes are defined between the set of mounting holes and the peripheral edge; and wherein the at least two securement holes enables the at least two connectors to operably engage with the circuit board. This exemplary embodiment or another exemplary embodiment may further include that the communication cable comprises: an inner conductor operably engaged with the bushing; an outer conductor operably engaged with the circuit board; and a dielectric component operably engaged with and positioned between the inner conductor and the outer conductor; wherein each of the inner conductor and the dielectric component defines a tapered configuration. This exemplary embodiment or another exemplary embodiment may further include that the inner conductor comprises: a first connection end operably engaged with a radio frequency (RF) detection device and defining a first diameter; and a second connection end operably engaged with the bushing and defining a second diameter; wherein the second diameter is greater than the first diameter. This exemplary embodiment or another exemplary embodiment may further include that the dielectric component comprises: a first connection end operably engaged with radio frequency (RF) detection device and defining a first diameter; and a second connection end operably engaged with the circuit board and defining a second diameter; wherein the second diameter is greater than the first diameter. This exemplary embodiment or another exemplary embodiment may further include a tubular member operably engaged with the circuit board; wherein the tubular member is configured to house the communication cable.

In another aspect, an exemplary embodiment of the present disclosure may provide a method. The method includes steps of receiving a first radio frequency (RF) signal from a RF detection device, wherein the RF detection device is operably engaged with a first RF apparatus; effecting the first RF signal to be sent, via a communication cable of the first RF apparatus, to a circuit board of the first RF apparatus; and dividing the first RF signal into at least two RF signals, via at least two transmission lines of the first RF apparatus, to at least two RF connectors of the first RF apparatus, wherein the at least two transmission lines are formed on the circuit board and operably engage with the communication cable. This exemplary embodiment or another exemplary embodiment may further include a step of sending the first RF signal, via a bushing of the first RF apparatus, to the at least two transmission lines of the first RF apparatus; wherein the communication cable and the at least two transmission lines are electrical communication with one another via the bushing. This exemplary embodiment or another exemplary embodiment may further include a step of passing air through the circuit board, via a set of cooling apertures defined in the circuit board, for dissipating heat from at least the circuit board. This exemplary embodiment or another exemplary embodiment may further include steps of sending the at least two RF signals from the at least two RF connectors to at least another two RF connectors of a second RF apparatus; combining the at least two RF signals into a second RF signal by at least another two transmission lines of the second RF apparatus; and sending the second RF signal, via a communication cable of the second RF apparatus, to a RF output device. This exemplary embodiment or another exemplary embodiment may further include a step of amplifying the at least two RF signals from a first power level to a second power level greater than the first power level prior to combining the at least two RF signals into the second RF signal. This exemplary embodiment or another exemplary embodiment may further include a step of sending the at least two RF signals, via the at least another two RF connectors of the second RF apparatus, to a bushing of the second RF apparatus; wherein the communication cable of the second RF apparatus and the at least two transmission lines are electrical communication with one another via the bushing of the second RF apparatus.

In yet another aspect, an exemplary embodiment of the present disclosure may provide a radiofrequency (RF) power amplifier. The RF power amplifier includes a radial power divider that is configured to process a received RF input signal and divide the received RF input signal into at least two divided RF signals. The RF power amplifier also includes an amplifier stage that is coupled to the at least two divided RF signals to amplify the at least two divided RF signals to a higher power level. The RF power amplifier includes a radial power combiner to combine amplified divided RF signals at the higher power level into an RF output signal. Each of the radial power combiner and radial power divider comprises: a circuit board; a communication cable operably engaged with the circuit board; at least two transmission lines formed on the circuit board and operably engaged with the communication cable; and at least two connectors operably engaged with the at least two transmission lines.

This exemplary embodiment or another exemplary embodiment may further include that each of the radial power combiner and the radial power divider further comprises: a bushing operably engaged with the circuit board, the communication cable, and the at least two transmission lines; wherein the bushing provides electrical communication between the communication cable and the at least two transmission lines; and wherein the bushing operably engages the communication cable with the circuit board. This exemplary embodiment or another exemplary embodiment may further include that each of the radial power combiner and the radial power divider further comprises: a first end of each transmission line of the at least two transmission lines operably engaged with the bushing; and a second end of each transmission line of the at least two transmission lines operably engaged with a connector of the at least two connectors. This exemplary embodiment or another exemplary embodiment may further include that each of the radial power combiner and the radial power divider further comprises: a first conductive surface forming an RF ground plane; a second conductive surface opposite to the first conductive surface on which the at least two transmission lines are formed; and a central opening defined in the circuit board that extends between the first conductive surface and the second conductive surface; wherein a portion of the communication cable operably engages with the circuit board inside of the central opening.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
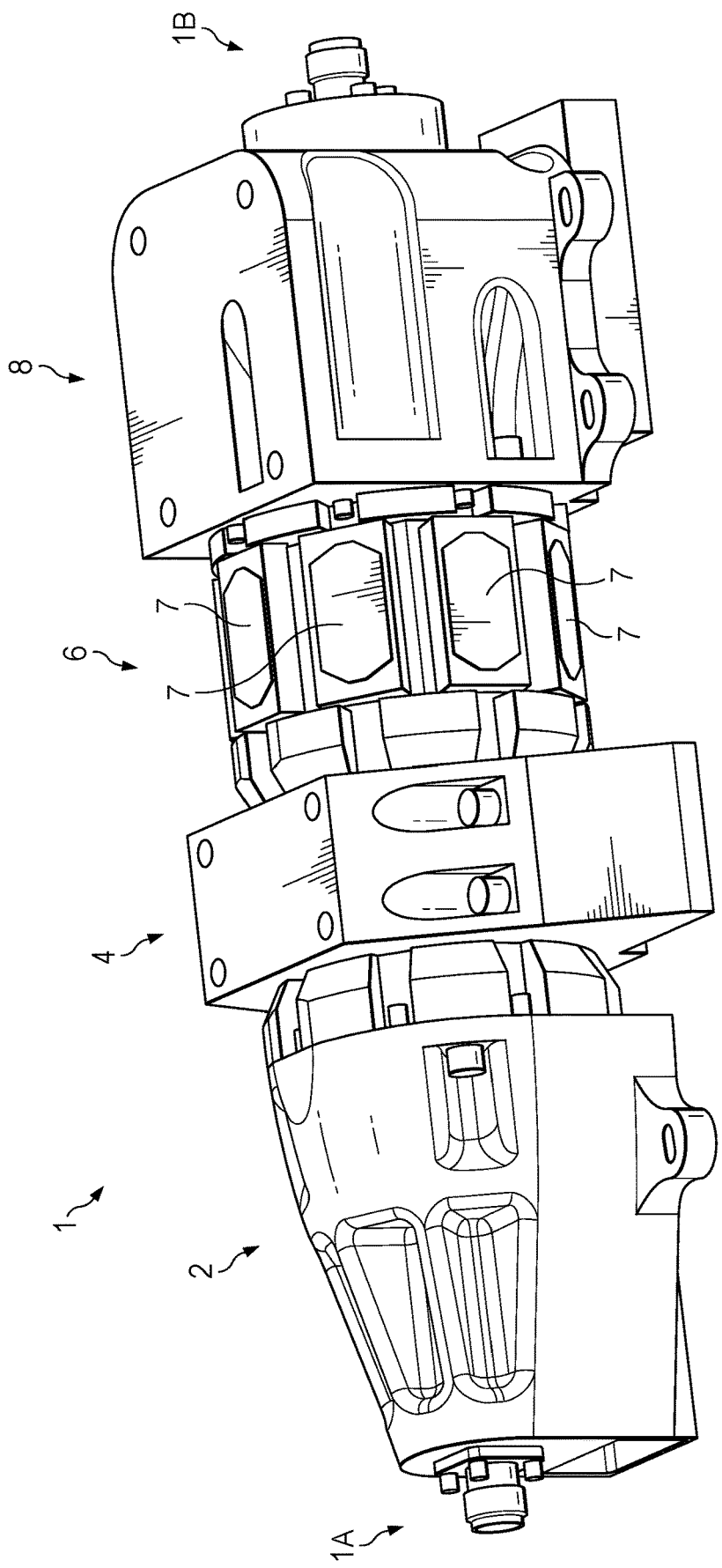
FIG. 1 is a front, first side isometric perspective view of a solid state power amplifier (SSPA) assembly.
Figure 2:
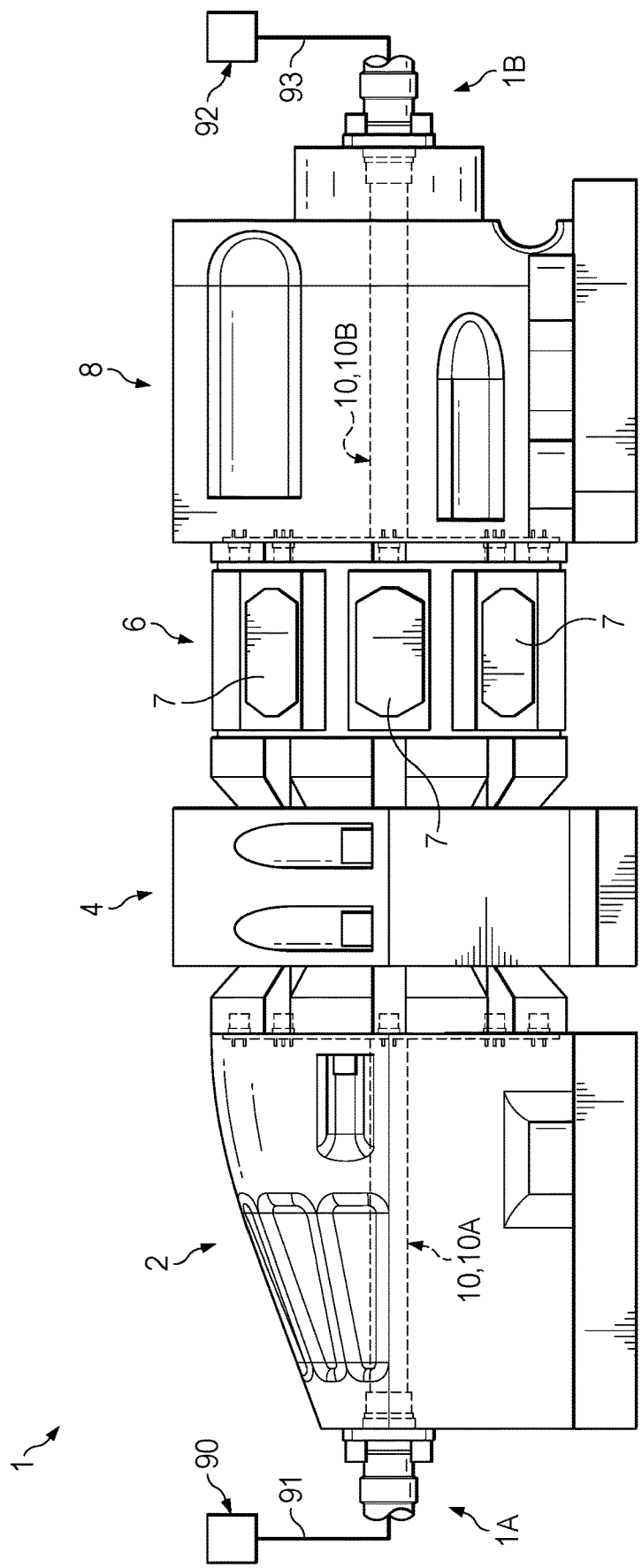
FIG. 2 is a first side elevation view of the SSPA assembly, wherein two radio frequency (RF) apparatuses are shown in phantom lines.

FIGS. 1-2 illustrate a solid state power amplifier assembly (hereinafter "assembly") generally referred to as 1. As provided herein, assembly 1 includes a first or input end 1A, a second end or output end 1B opposite to the first end 1A, and a longitudinal direction defined therebetween. Such components and parts of assembly 1 are described in greater detail below.

It should be appreciated that assembly 1 is adapted to operably engage with any type of platform, either military platform or civilian platform (regardless of whether it is manned or unmanned), dictated by the implementation of assembly 1. In one example, assembly 1 described and illustrated herein may be adapted to operably engage with a platform that is capable of moving. In another example, assembly 1 described and illustrated herein may be adapted to operably engage with a platform that remains stationary. In yet another example, assembly 1 described and illustrated herein may be adapted to operably engage with a ground military platform. In yet another example, assembly 1 described and illustrated herein may be adapted to operably engage with an aerial military platform. In yet another example, assembly 1 described and illustrated herein may be adapted to operably engage with a naval military platform (e.g., surface and sub-surface vessels). In yet another example, assembly 1 described and illustrated herein may be adapted to operably engage with a space-based platform.

As provided herein, assembly 1 includes various housing components for protecting various signal powering apparatuses interior of these housing components. For clarity of description, these housing components are described and discussed separately. However, it should be apparent to one of skilled in the art that a housing could be a unitary structure having sections or portions that are described below. Thus, separate components detailed herein could be combined into a one or more structures. As best seen in FIG. 2, assembly 1 includes a first housing 2 that is positioned proximate to the first end 1A and extends longitudinally from the first end 1A towards the second end 1B. It should be understood that first housing 2 enables the assembly 1 to operably engage with a platform at a first position for maintaining the assembly 1 with the platform. It should also be understood that first housing 2 enables air to flow through the interior of first housing 2 during operation of assembly 1 for cooling and/or heat dissipation purposes of interior signal powering apparatuses, which are described in greater detail below.

Assembly 1 also includes a second housing 4. As best seen in FIG. 2, second housing 4 operably engages with the first housing 2 and is positioned between the first housing 2 and the second end 1B. Similar to first housing 2, it should be understood that second housing 4 enables the assembly 1 to operably engage with a platform at a second position for maintaining the assembly 1 with the platform. It should also be understood that second housing 4 enables air to flow through the interior of second housing 4 during operation of assembly 1 for cooling and/or heat dissipation purposes of interior signal powering apparatuses, which are described in greater detail below.

Assembly 1 also includes a third housing 6. As best seen in FIG. 2, third housing 6 operably engages with the second housing 4 and is positioned between the second housing 4 and the second end 1B. Third housing 6 may also include a series of amplifying devices or amplifiers 7 for amplifying one or more signals that are transmitted through the series of amplifiers 7. In one example, the series of amplifiers 7 discussed herein may be monolithic microwave integrated circuits (MMICs) for amplifying one or more radio frequency (RF) signals detected by an RF detection device operably engaged with assembly 1. Such use and purposes of the series of amplifiers 7 being used with a RF apparatus of assembly 1 is discussed in greater detail below.

Assembly 1 also includes a fourth housing 8. As best seen in FIG. 2, fourth housing 8 operably engages with the third housing 6 and is positioned between the third housing 6 and the second end 1B. Similar to first housing 2 and second housing 4, it should be understood that fourth housing 8 enables the assembly 1 to operably engage with a platform at a third position for maintaining the assembly 1 with the platform. It should also be understood that fourth housing 8 enables air to flow through the interior of fourth housing 8 during operation of assembly 1 for cooling and/or heat dissipation purposes of interior signal powering apparatuses, which are described in greater detail below.

Assembly 1 also includes at least one radial power divider-combiner or RF apparatus 10 that operably engages with and positioned interior of first housing 2 and fourth housing 8. As best seen in FIG. 2, assembly 1 includes a first RF apparatus 10A that operably engages with and positioned interior of the first housing 2. In the illustrated embodiment, first RF apparatus 10A is provided in first configuration or dividing configuration where the first RF apparatus 10A divides a first RF signal into at least two RF signals or a set of RF signals. Still referring to FIG. 2, assembly 1 also includes a second RF apparatus 10B that operably engages with and positioned interior of the fourth housing 8. In the illustrated embodiment, second RF apparatus 10B is provided in second configuration or combining configuration where the second RF apparatus 10B combines the at least two RF signals or set of RF signals into a second RF signal. It should be understood that each of the first RF apparatus 10A and the second RF apparatus 10B have substantially similar structural configurations while being operable in different configurations. In the present disclosure, the RF apparatus 10B may be configured to operate at substantially higher power level than RF apparatus 10A due a plurality of high power RF amplifiers that feed into RF apparatus 10B. Insomuch as the first RF apparatus 10A and the second RF apparatus 10B have substantially similar structural configurations, the first RF apparatus 10A will be discussed herein for brevity. It should be understood, however, that while the first RF apparatus 10A is being described herein, the description of the first RF apparatus 10A applies equally to the second RF apparatus 10B.

It should be understood that first RF apparatus 10A is a radial power divider that is configured to divide a RF signal into at least two RF signals as discussed herein. It should also be understood that second RF apparatus 10B is a radial power combiner that is configured to combine at least two RF signals into a single RF signal as discussed herein wherein the second RF apparatus 10B is reciprocal with the first RF apparatus 10A. It should also be understood that each RF apparatus 10 described herein is a passive device that either divide a RF signal into at least two RF signals or combines at least two RF signals into a single RF signal.

Figure 3:
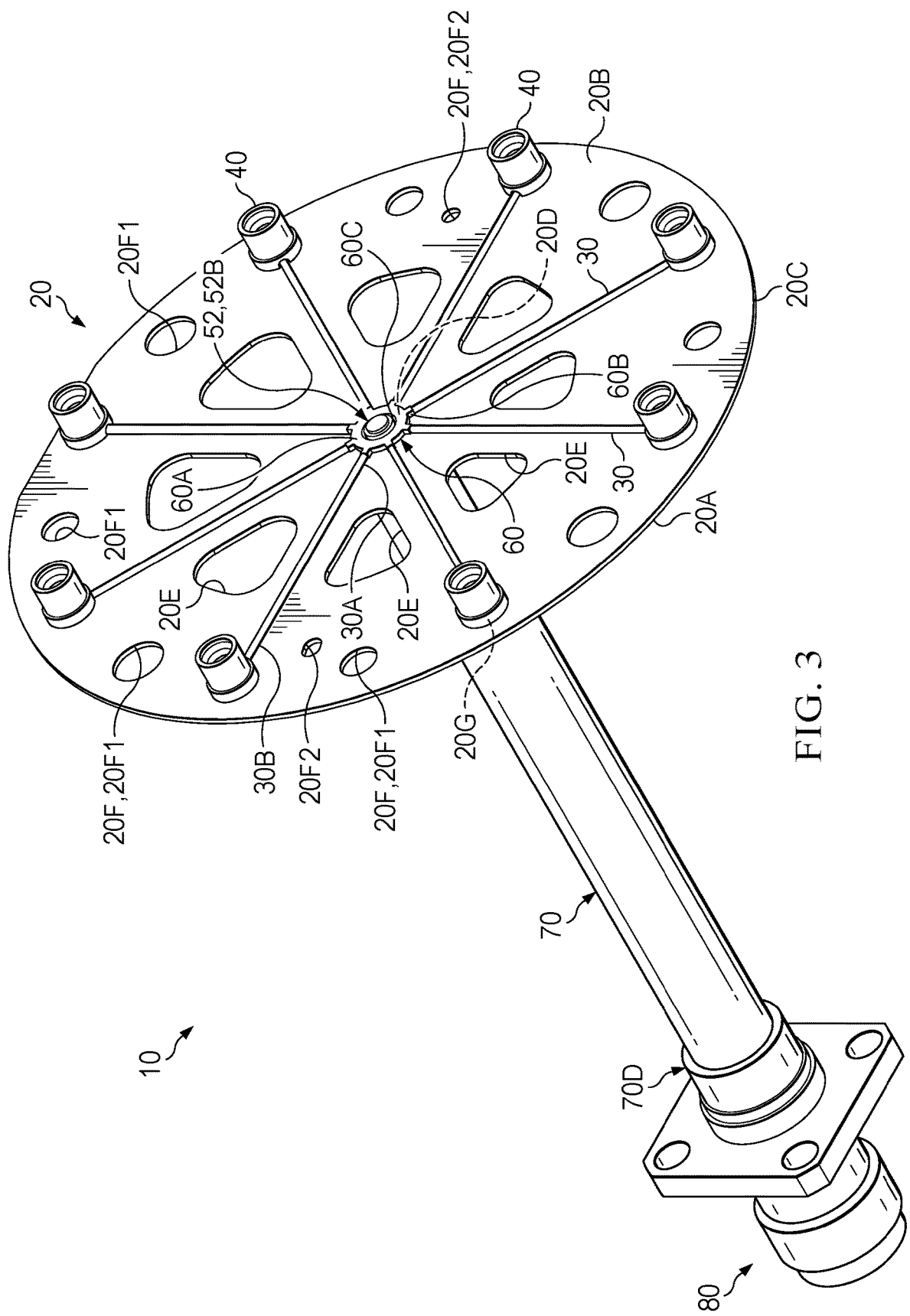
FIG. 3 is a front, bottom, second side elevation view of the RF apparatus in accordance with one aspect of the present disclosure.
Figure 4:
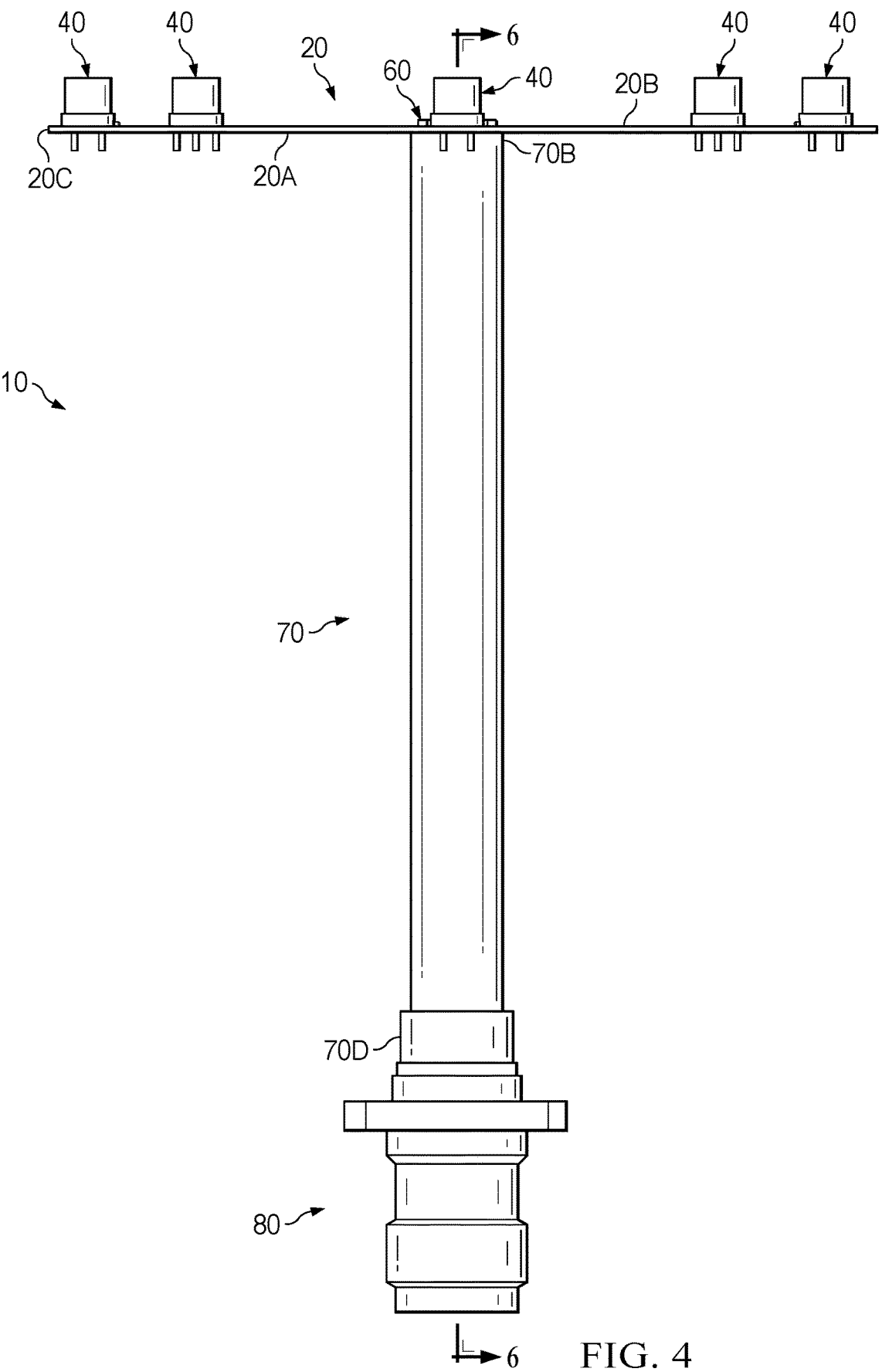
FIG. 4 is a second side elevation view of the RF apparatus shown in FIG. 3.

RF apparatus 10 includes a circuit board 20. As best seen in FIGS. 3 and 4, circuit board 20 includes a first conductive surface or outer surface 20A which forms a RF ground plane, a second conductive surface or inner surface 20B opposite to first conductive surface 20A which is the surface that is used to form RF transmission lines (discussed below), and a peripheral edge 20C defined between the first conductive surface 20A and the second conductive surface 20B. As discussed in greater detail below, circuit board 20 is configured to house and secure various components and parts of RF apparatus 10 for dividing a RF signal into at least two RF signals.

Figure 6:
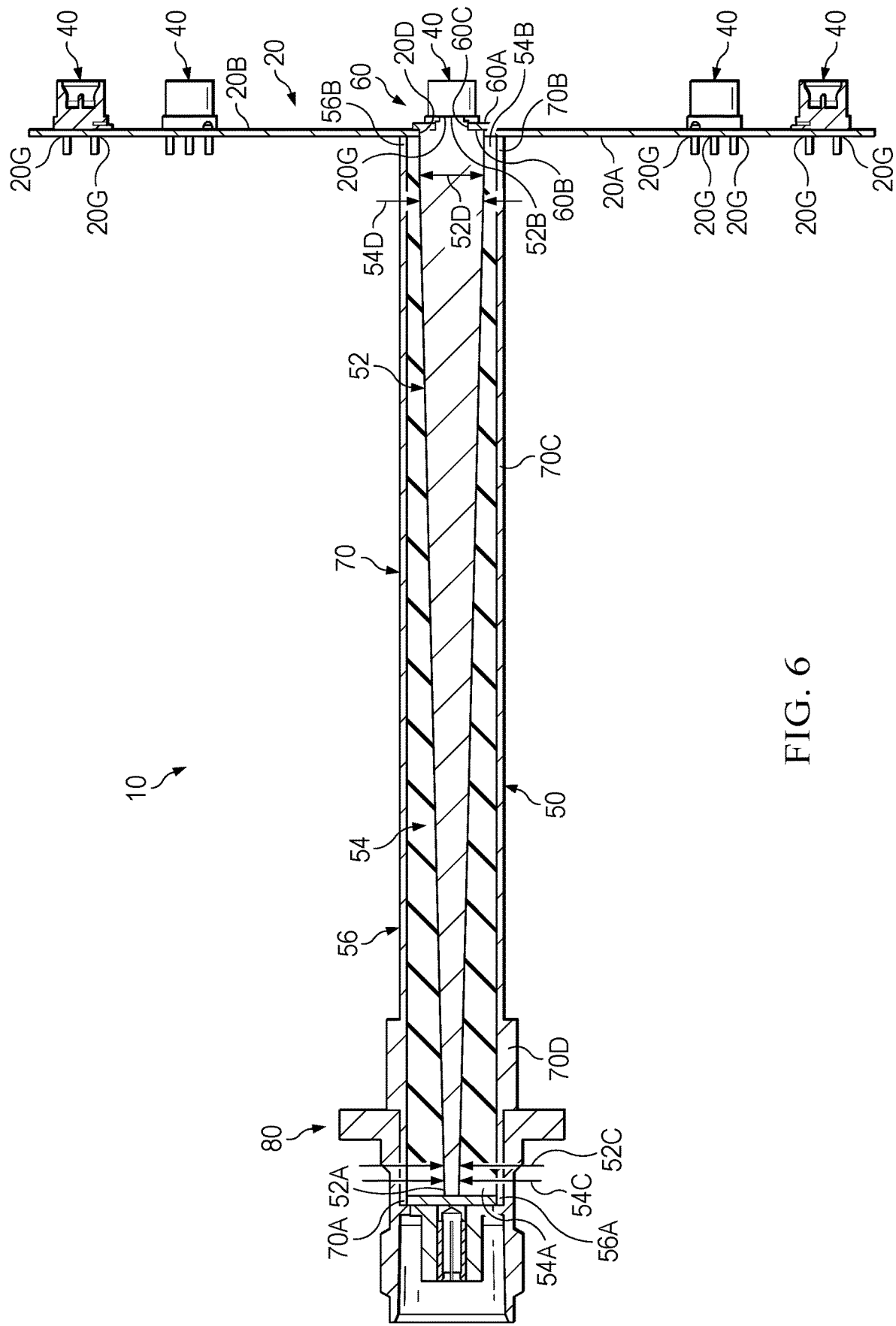
FIG. 6 is a longitudinal sectional view of the RF apparatus taken in the direction of line 6-6 in FIG. 4.

Circuit board 20 also defines a central opening 20D. As best seen in FIG. 6, central opening 20D extends entirely through circuit board 20 from the first conductive surface 20A to the second conductive surface 20B such that the first conductive surface 20A and the second conductive surface 20B are in fluid communication with one another at the central opening 20D. Central opening 20D is also defined at the central and/or medial point of circuit board 20. Such use and purpose of central opening 20D is described in greater detail below.

Figure 5:
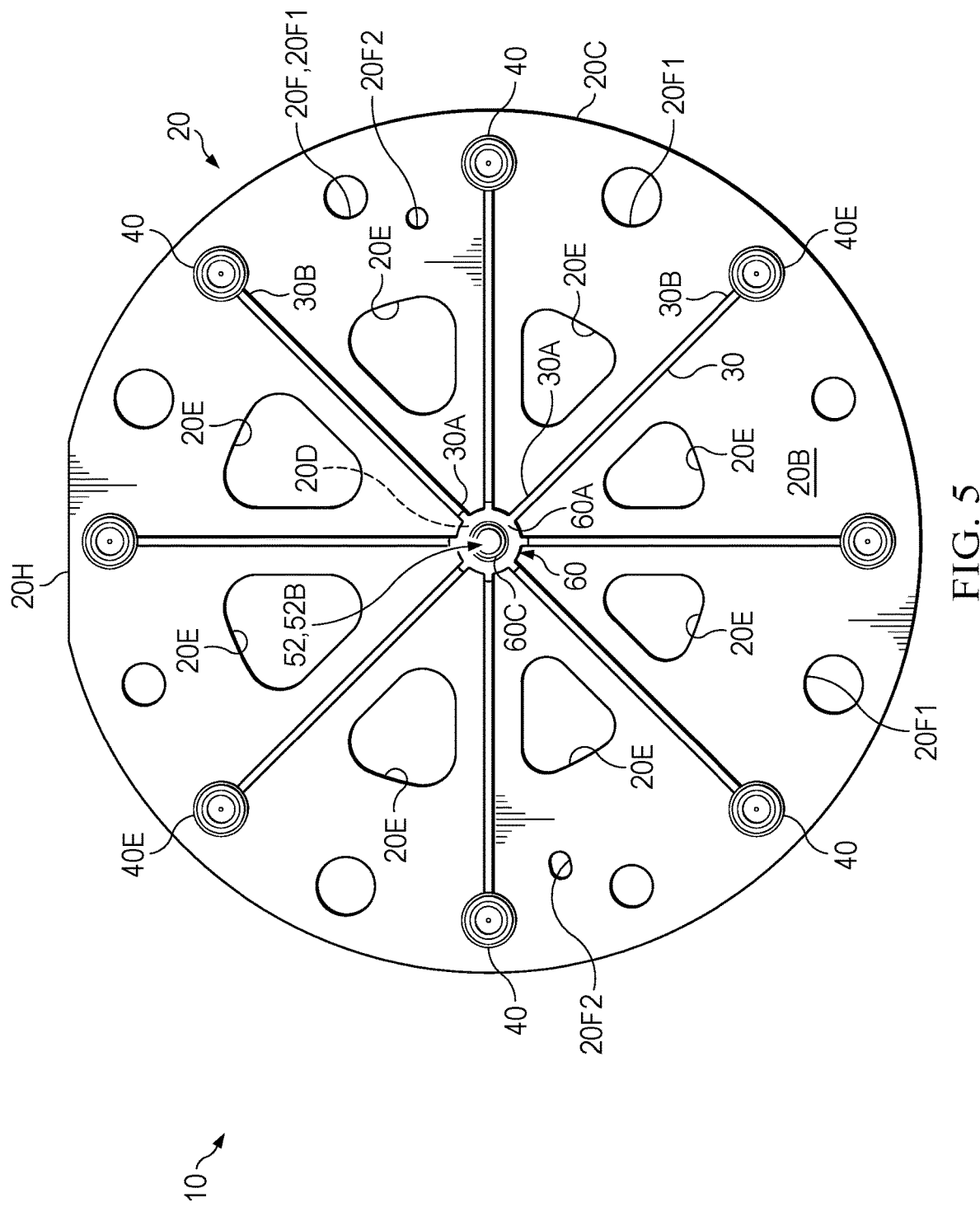
FIG. 5 is a front elevation view of the RF apparatus shown in FIG. 3.

Circuit board 20 also defines a set of cooling apertures 20E. As best seen in FIGS. 3 and 5, each cooling aperture of the set of cooling apertures 20E extends entirely through circuit board 20 from the first conductive surface 20A to the second conductive surface 20B. The first conductive surface 20A and the second conductive surface 20B are also in fluid communication with one another at each cooling aperture of the set of cooling apertures 20E. As best seen in FIG. 5, the set of cooling apertures 20E is positioned between the peripheral edge 20C of circuit board 20 and the central opening 20D. Still referring to FIG. 5, the set of cooling apertures 20E also surrounds the central opening 20D when viewed from a front elevation view such that the central opening 20D is defined interior to the set of cooling apertures 20E. During operation, the set of cooling apertures 20E enables air to flow through the circuit board 20 for cooling and/or dissipating heat from the circuit board 20 when RF apparatus 10 divides one or more RF signals into sets of RF signals; such operations of dividing RF signals is described in greater detail below.

Each cooling apertures of the set of cooling apertures 20E defined by circuit board 20 may have any suitable shape that cools and/or dissipates heat from the circuit board 20 when RF apparatus 10 divides one or more RF signals into sets of RF signals. In one example, at least one cooling aperture of the set of cooling apertures 20E defined by circuit board 20 may generally have a triangular-shape (when viewed from a front elevation view) for cooling and/or dissipating heat from the circuit board 20 when RF apparatus 10 divides one or more RF signals into sets of RF signals. In the present disclosure, each one cooling aperture of the set of cooling apertures 20E defined by circuit board 20 generally has a triangular-shape (when viewed from a front elevation view) for cooling and/or dissipating heat from the circuit board 20 when RF apparatus 10 divides one or more RF signals into sets of RF signals.

Circuit board 20 also defines at least one set of mounting holes 20F for engaging the circuit board 20 with the first housing 2. As best seen in FIG. 5, circuit board 20 defines a set of first mounting holes 20F1 that extends entirely through circuit board 20 from the first conductive surface 20A to the second conductive surface 20B. The first conductive surface 20A and the second conductive surface 20B are also in fluid communication with one another at each mounting hole of the set of first mounting holes 20F1. As best seen in FIG. 5, the set of first mounting holes 20F1 is positioned between the peripheral edge 20C of circuit board 20 and the set of cooling apertures 20E. Still referring to FIG. 5, the set of first mounting holes 20F1 also surrounds the central opening 20D and the set of cooling apertures 20E when viewed from a front elevation view such that the central opening 20D and the set of cooling apertures 20E are defined interior to the set of first mounting holes 20F1. Upon assembly, the set of first mounting holes 20F1 enables one or more fasteners (not illustrated) to pass through circuit board 20 to operably engage the circuit board 20 with the first housing 2 (see dotted outline of RF apparatus 10A in FIG. 2).

Circuit board 20 may also define a set of second mounting holes 20F2 that extends entirely through circuit board 20 from the first conductive surface 20A to the second conductive surface 20B. The first conductive surface 20A and the second conductive surface 20B are also in fluid communication with one another at each mounting hole of the set of second mounting holes 20F2. As best seen in FIG. 5, the set of second mounting holes 20F2 is positioned between the set of cooling apertures 20E and the set of first mounting holes 20F1. Still referring to FIG. 5, the set of second mounting holes 20F2 also surrounds the central opening 20D and the set of cooling apertures 20E when viewed from a front elevation view such that the central opening 20D and the set of cooling apertures 20E are defined interior to the set of second mounting holes 20F2. Upon assembly, the set of second mounting holes 20F2 may enable one or more alignment pins (not illustrated) of first housing 2 to align circuit board 20 in a desired orientation inside of first housing 2 (see dotted outline of RF apparatus 10A in FIG. 2).

Circuit board 20 may also define a set of securement holes 20G that extends entirely through circuit board 20 from the first conductive surface 20A to the second conductive surface 20B. The first conductive surface 20A and the second conductive surface 20B are also in fluid communication with one another at each securement hole of the set of securement holes 20G. As best seen in FIG. 5, the set of securement holes 20G is positioned between the set of cooling apertures 20E and the peripheral edge 20C. Still referring to FIG. 5, the set of securement holes 20G also surrounds the central opening 20D and the set of cooling apertures 20E when viewed from a front elevation view such that the central opening 20D and the set of cooling apertures 20E are defined interior to the set of securement holes 20G. The set of securement holes 20G is aligned with the set of first mounting holes 20F1 when view from a front elevation view such that the set of first mounting holes 20F1 and the set of securement holes 20G are aligned on a single axis. Such use and purpose of the set of securement holes 20G is described in greater detail below.

While circuit board 20 defines a set of securement holes 20G, a circuit board discussed herein may include any suitable number of securement holes based on various considerations, including the size, shape, and configuration of the circuit board, the size, shape, and configuration of the assembly, number of transmission lines provided on a RF apparatus, and other various considerations. Examples of suitable numbers of securement holes defined in a circuit board of a RF apparatus include at least two securement holes, a plurality of securement holes, four securement holes, eight securement holes, sixteen securement holes, thirty-two securement holes, and other suitable number of securement holes defined in a circuit board of an RF apparatus. In the illustrated embodiment, circuit board 20 of RF apparatus 10 defines eight securement holes 20G for securing eight RF connectors, which are described in greater detail below.

Circuit board 20 also includes a planar surface 20H. As best seen in FIG. 5, planar surface 20H extends inwardly from the peripheral edge 20C towards the central opening 20D. As such, the planar surface 20H disrupts and/or interrupts the continuous peripheral edge 20C of circuit board 20. During assembly, planar surface 20H may enable the circuit board 20 to operably engage with the first housing 2 to prevent the RF apparatus 10 from rotating inside of first housing 2.

RF apparatus 10 also includes a set of transmission lines 30. As best seen in FIG. 5, each transmission line of the set of transmission lines 30 extends radially outward from the central opening 20D to a respective securement hole of the set of securement holes 20G. Each transmission line of the set of transmission lines 30 includes a first connection end 30A that is located proximate to the central opening 20D, a second connection end 30B that is located proximate to a respective securement hole of the set of securement holes 20G and is longitudinally opposite to the first connection end 30A, and a transmission signal line defined therebetween. As best seen in FIG. 3, the set of transmission lines 30 is formed on the second conductive surface 20B of circuit board 20 where each transmission line of the set of transmission lines 30 is formed of a conductive material for transmitting RF signals along circuit board 20. Such operation of the set of transmission lines 30 is discussed in greater detail below.

While RF apparatus 10 includes a set of transmission lines 30 for transmitting RF signals along circuit board 20, any RF apparatus discussed herein may include any suitable number of transmission lines based on various considerations, including the size, shape, and configuration of the circuit board, the size, shape, and configuration of the assembly, number of amplifiers provided in the assembly, and other various considerations. Examples of suitable numbers of transmission lines for an RF apparatus include at least two transmission lines, a plurality of transmission lines, four transmission lines, eight transmission lines, sixteen transmission lines, thirty-two transmission lines, and other suitable numbers of transmission lines for an RF apparatus. In the illustrated embodiment, RF apparatus 10 includes eight transmission lines 30 for transmitting a divided set of RF signals along circuit board 20.

While the set of transmission lines 30 have been discussed herein, any suitable components or elements may be equipped with the RF apparatus 10 for transmitting one or more signals along the RF apparatus 10. In one exemplary embodiment, an RF apparatus discussed herein may be equipped with a set of micro strips for transmitting one or more signals along the RF apparatus. In another exemplary embodiment, an RF apparatus discussed herein may be equipped with a set of striplines for transmitting one or more signals along the RF apparatus.

RF apparatus 10 may also include a set of RF connectors 40. As best seen in FIGS. 5-6, each RF connector of the set of RF connectors 40 operably engages with the circuit board 20 inside of a respective securement hole of the set of securement holes 20G. As best seen in FIG. 5, each RF connector of the set of RF connectors 40 also operably engages with a respective transmission line of the set of transmission lines 30. Particularly, each RF connector of the set of RF connectors 40 operably engages with the second connection end 30B of a respective transmission line of the set of transmission lines 30. As discussed in greater detail below, the set of RF connectors 40 is configured to output a set of RF signals, which is divided from a single RF signal by the set of transmission lines 30, towards the series of amplifiers 7 for amplification and towards the second RF apparatus 10B for combining the set of RF signals into a second RF signal having a greater RF power level.

While RF apparatus 10 includes a set of RF connectors 40 for transmitting one or more sets of RF signals from first RF apparatus 10A to second apparatus 10B, any RF apparatus discussed herein may include any suitable number of RF connectors based on various considerations, including the size, shape, and configuration of the circuit board, the size, shape, and configuration of the assembly, number of transmission lines provided with a RF apparatus, and other various considerations. Examples of suitable numbers of RF connectors for an RF apparatus include at least two RF connectors, a plurality of RF connectors, four RF connectors, eight RF connectors, sixteen RF connectors, thirty-two RF connectors, and other suitable number of RF connectors for an RF apparatus. In the illustrated embodiment, RF apparatus 10 includes eight RF connectors 40 for transmitting one or more sets of RF signals from first RF apparatus 10A to second apparatus 10B.

It should be understood that any suitable RF connector may be used for each RF connector of the set of RF connectors 40 described and illustrated herein. As such, each RF connector of the set of RF connectors 40 may be a commercially-available RF connector that is configured to transmit RF signals from the first RF apparatus 10A to second apparatus 10B.

RF apparatus 10 also include a communication cable 50. As best seen in FIG. 6, communication cable 50 operably engages with the circuit board 20 and the set of transmission lines 30. Still referring to FIG. 6, communication cable 50 includes a first end 50A positioned at the first end 1A of assembly 1 and away from the circuit board 20, a second end 50B longitudinally opposite to the first end 50A and operably engages with the circuit board 20 and the set of transmission lines 30, and a longitudinal direction defined therebetween. A portion of the communication cable 50 also passes through the circuit board 20, via the central opening 20D, to operably engage with the set of transmission lines 30 such that the set of transmission lines 30 and the communication cable 50 are in electrical communication with one another. Such parts and components of communication cable 50 are discussed in greater detail below.

In the present disclosure, the communication cable 50 is a coaxial cable and includes an inner conductor 52. As best seen in FIG. 6, inner conductor 52 includes a first connection end 52A at the first end 50A of the communication cable 50, a second connection end 52B that is opposite to the first connection end 52A and that operably engages with the set of transmission lines 30, and a longitudinal axis defined therebetween. In one example, the second connection end 52B of inner conductor 52 may be threaded and/or include a threaded connection for threadably engaging with a bushing of RF apparatus 10, which is discussed in greater detail. Inner conductor 52 also defines a first diameter 52C at the first connection end 52A and a second diameter 52D at the second connection end 52B that is greater than the first diameter 52C. Such difference of diameters 52C, 52D at the first connection end 52A and the second connection end 52B creates a tapered cross-section along the length of the inner conductor 52 where the inner conductor 52 tapers outwardly when moving longitudinally from the first connection end 52A to the second connection end 52B.

Communication cable 50 includes a dielectric component 54 that operably engages with the inner conductor 52 where the dielectric component 54 is circumferentially disposed about the inner conductor 52. As best seen in FIG. 6, dielectric component 54 includes a first connection end 54A that operably engages with the first connection end 52A of inner conductor 52, a second connection end 54B that is opposite to the first connection end 54A and that operably engages with the first conductive surface 20A of circuit board 20, and a longitudinal axis defined therebetween.

Dielectric component 54 also defines a first diameter 54C at the first connection end 54A and a second diameter 54D at the second connection end 54B that is greater than the first diameter 54C. Such difference of diameters 54C, 54D at the first connection end 54A and the second connection end 54B also creates a tapered cross-section along the length of the dielectric component 54 where the dielectric component 54 tapers outwardly when moving longitudinally from the first connection end 54A to the second connection end 54B. Such tapered configuration of dielectric component 54 also matches with the tapered configuration of inner conductor 52 (see FIG. 6).

Communication cable 50 includes an outer conductor 56 that operably engages with the dielectric component 54 where the outer conductor 56 is circumferentially disposed about the inner conductor 52 and the dielectric component 54. As best seen in FIG. 6, outer conductor 56 includes a first connection end 56A that operably engages with the first connection end 54A of dielectric component 54, a second connection end 56B that is opposite to the first connection end 56A and that operably engages with the first conductive surface 20A of circuit board 20, and a longitudinal axis defined therebetween. As seen in FIG. 6, outer conductor 56 defines a continuous, non-tapered diameter along the entire length of outer conductor 56 from the first connection end 56A to the second connection end 56B.

While the communication cable 50 is shown and described as a coaxial cable, any suitable communication cable may be equipped in an RF apparatus described and illustrated herein. As such, any suitable communication cable may be equipped herein based on the desired waveform or waveguide intended to be analyzed by apparatus.

RF apparatus 10 also includes a bushing 60. As best seen in FIG. 6, bushing 60 includes a top end 60A that is free from engaging the circuit board 20. Still referring to FIG. 6, bushing 60 also includes a bottom end 60B that opposes the top end 60A and operably engages with the second conductive surface 20B of circuit board 20. Referring to FIG. 5, the bottom end 60B of bushing 60 also operably engages with the first connection end 30A of each transmission line of the set of transmission lines 30 to enable electrical communication between the set of transmission lines 30 and the bushing 60.

Still referring to FIG. 6, bushing 60 also defines a passageway 60C that extends longitudinally through the bushing 60 from the top end 60A to the bottom end 60B. Upon assembly of RF apparatus 10, the second connection end 52B of inner conductor 52 operably engages with the bushing 60 inside of the passageway 60C. In one exemplary embodiment, passageway 60C may be a threaded passageway that threadably engages with second connection end 52B of inner conductor 52. Such engagement between inner conductor 52 and bushing 60 cinches and/or pulls the communication cable 50 against the first conductive surface 20A of circuit board 20 to releasably secure the communication cable 50 with circuit board 20. Such engagement between inner conductor 52 and bushing 60 also provides an electrical connection between the set of transmission lines 30 and the inner conductor 52 due to bushing 60 being an interconnection between the set of transmission lines 30 and the inner conductor 52. In the present disclosure, the interconnection between inner conductor 52 and bushing 60 is the point where a Quasi-Transverse Electro-Magnetic (TEM) propagating mode of the transmission lines 30 is converted to the TEM mode that propagates in the communication cable 50. In one example, bushing 60 may be omitted and replaced with a conductive material that operably engages the circuit board 20, the set of transmission lines 30, and communication cable 50 with one another while enabling electrical communication between the set of transmission lines 30 and the inner conductor 52.

In the present disclosure, any suitable conductive materials may be used to form each transmission line of the set of transmissions lines 30, each RF connector of the set of RF connectors 40, inner conductor 52 and outer conductor 54 of coaxial cable 50, and bushing 60 to transfer signals through RF apparatus 10. In one instance, each transmission line of the set of transmissions lines 30, each RF connector of the set of RF connectors 40, inner conductor 52 and outer conductor 54 of coaxial cable 50, and bushing 60 are made of the same conductive material to transfer signals through RF apparatus 10. In another instance, each transmission line of the set of transmissions lines 30, each RF connector of the set of RF connectors 40, inner conductor 52 and outer conductor 54 of coaxial cable 50, and/or bushing 60 are made of the different conductive materials while still transferring signals through RF apparatus 10.

RF apparatus 10 may also include a tubular member 70 that forms the outer conductor 56 of the communication cable 50. As best seen in FIG. 6, tubular member 70 includes a first end 70A that is remote from circuit board 20, a second end 70B that is longitudinally opposite to the first end 70A and that operably engages with the first conductive surface 20A of the circuit board 20, and a longitudinal axis defined therebetween. Tubular member 70 also defines a passageway 70C that extends entirely through the tubular member 70 from the first end 70A to the second end 70B. As best seen in FIG. 6, the passageway 70C of tubular member 70 is configured to house and engage with the communication cable 50. Tubular member 70 may also include a shoulder or stop 70D that extends radially from the tubular member 70 proximate to the first end 70A; such use and purpose of stop 70D is described in greater detail below.

RF apparatus 10 may also include an RF connector assembly 80. As best seen in FIGS. 3 and 6, RF connector assembly 80 operably engages with the communication cable 50 and the tubular member 70, particularly with the first end 50A of communication cable 50 and the first end 70A of tubular member 70. RF connector assembly 80 also directly abuts and engages with the stop 70D to ensure the RF connector assembly 80 remains at a fixed position with the tubular member 70. RF connector assembly 80 is also in electrical communication with the communication cable 50, particularly the inner conductor 52, for transmitting one or more RF signals detected by a RF detection device provided on the platform.

Assembly 1 may also be configured to operably engage with one or more radiofrequency (RF) detection devices 90 for receiving one or more RF signals detected by the one or more RF detection devices 90. As best seen in FIG. 2, RF detection device 90 sends and/or transmits the one or more RF signals via an input electrical connection 91 that operably engages the RF connector assembly 80 of first RF apparatus 10A and the RF detection device 90 with one another. Such connection between the RF connector assembly 80 of first RF apparatus 10A and the RF detection device 90 enables the first RF apparatus 10A to receive the one or more RF signals from the RF detection device 90 during operation. As described in greater detail below, the first RF apparatus 10A is configured to divide the one or more RF signals into one or more sets of RF signals based on the configuration of the first RF apparatus 10A. In one example, RF detection device 90 is an antenna that may be coupled to other radiofrequency items such as one or more radiofrequency filters.

Assembly 1 may also be configured to operably engage with one or more radiofrequency (RF) output devices 92 for outputting one or more amplified RF signals from the second RF apparatus 10B. As best seen in FIG. 2, RF output device 92 may receive the one or more amplified RF signals from the second RF apparatus 10B via an output electrical connection 93 that operably engages the RF connector assembly 80 of the second RF apparatus 10B and the RF output device 92 with one another. Such connection between the RF connector assembly 80 of the second RF apparatus 10B and the RF output device 92 enables the RF output device 92 to send and/or transmit the one or more amplified RF signals to other RF devices provided on the platform or positioned remote from the platform during operation. As described in greater detail below, the second RF apparatus 10B is configured to combine the one or more sets of amplified RF signals into a single amplified RF signal based on the configuration of the second RF apparatus 10B. In one example, RF detection device 92 is an antenna that may be coupled to other radiofrequency items such as one or more radiofrequency filters.

While the first and second RF apparatuses 10A, 10B are electrically connected to RF detection device 90 and RF output device 92, first and second RF apparatuses 10A, 10B may be electrically connected to any suitable number of RF devices for receiving and outputting RF signals. In one exemplary embodiment, first and second RF apparatuses 10A, 10B may be electrically connected to a single RF device that is capable of detecting and inputting RF signals into first RF apparatus 10A (like RF detection device 90) and capable of outputting RF signals from second RF apparatus 10B (like RF detection device 92).

The configuration of the RF apparatus 10 is considered advantageous at least because RF apparatus 10 is capable of achieving a low insertion loss over a bandwidth that greater than at least 2:1. In the present disclosure, RF apparatus 10 is capable of achieving a low insertion loss that is less than 1 dB over a bandwidth of greater than 20:1. Additionally, the typical VSWR over this exemplary bandwidth referenced to 50 Ohms being less than 1.5:1.

Having now described the parts and components of first RF apparatus 10A and second RF apparatus 10B, methods of dividing and combining RF signals with first RF apparatus 10A and second RF apparatus 10B are described in greater detail below.

During operation, assembly 1 receives one or more RF signals from a RF detection device 90 operably engages with assembly 1 via RF connector assembly 80. As best seen in FIG. 2, RF detection device 90 may detect one or more RF signals from a desired target or point of interest (POI) found in the surrounding area or far field relative to the assembly 1. Upon detection, RF detection device 90 sends a first RF signal, via the input electrical connection 91, to the RF connector assembly 80 of the first RF apparatus 10A. The first RF signal is then transmitted through the communication cable 50 of first RF apparatus 10A towards the circuit board 20 where the first RF apparatus 10A is divided into a set of RF signals based on the configuration of first RF apparatus 10A.

Prior to being divided into a set of RF signals, the first RF signal is sent from the communication cable 50 to the bushing 60 of first RF apparatus 10A. Based on the configuration of first RF apparatus 10A, the bushing 60 transmits the first RF signal to set of transmission lines 30 where the set of transmission lines 30 divides the first RF signal into a set of RF signals. As shown in FIG. 5, each transmission line of the set of transmission lines 30 is configured to receive and divide the first RF signal into a set of RF signals as the first RF signal is received at the first connection end 30A of each transmission line of the set of transmission lines 30. Upon being received at the first connection end 30A, each RF signal of the set of RF signals is then sent to the second connection end 30B of each transmission line of the set of transmission lines 30 to be outputted from the set of RF connectors 40.

Upon being divided, the set of RF signals are then transmitted from the set of RF connectors 40 of the first RF apparatus 10A to the series of amplifiers 7. While not illustrated herein, the set of RF connectors 40 of the first RF apparatus 10A electrically connects with the series of amplifiers 7 via a set of electrical connections or wires. Such connections enable the series of amplifiers 7 to amplify the set of RF signals subsequent to the set of RF signals being sent from the RF connectors 40 of first RF apparatus 10A to the series of amplifiers 7. Upon being received by the series of amplifiers 7, the series of amplifiers is configured to increase or enhance the RF power level of each RF signal of the set of RF signals from a first power level to a second power level that is greater than the first power level.

Upon such amplification, the set of amplified RF signals is then sent to the second RF apparatus 10B for combining the set of amplified RF signals to a second RF signal. While not illustrated herein, the set of RF connectors 40 of the second RF apparatus 10B electrically connects with the series of amplifiers 7 via another set of electrical connections or wires. Such connections enable the series of amplifiers 7 to send the set of amplified RF signals to the second RF apparatus 10B via the set of RF connectors 40.

Upon being received by the second RF apparatus 10B, the set of amplified RF signals is then transmitted from the set of RF connectors 40 of second RF apparatus 10B to the bushing 60 of second RF apparatus 10B via the set of transmission lines 30. Particularly, each amplified RF signal of the set of amplified RF signals is transmitted from the second connection end 30B of each transmission line of the set of transmission lines 30 of second RF apparatus 10B to the first connection end 30A of each transmission line of the set of transmission lines 30 of second RF apparatus 10B. The set of amplified RF signals are then combined into a second RF signal as the set of amplified RF signals is received at the communication cable 50 of second RF apparatus 10B and the bushing 60 of second RF apparatus 10B. It should be appreciated that the second RF signal defines a greater RF power than the first RF signal initially received by first RF apparatus 10A.

Once combined, the second RF signal is then transmitted along communication cable 50 of second RF apparatus 10B to the RF connector assembly 80 of second RF apparatus 10B. At this point, the second RF signal may then be transmitted through the RF connector assembly 80 of second RF apparatus 10B to the RF output device 92 via the output electrical connection 93. In one instance, the RF output device 92 may then emit and/or transmit the second RF signal to one or more RF devices provided on the platform. In another instance, RF output device 92 may then emit and/or transmit the second RF signal to one or more RF devices that are remote from the platform.

During operation, air may flow through first housing 2, second housing 4, third housing 6, and fourth housing 8 to cool and/or dissipate heat away from the first RF apparatus 10A and the second RF apparatus 10B. In one instance, air may flow into first housing 2 and second housing 4 for cooling the circuit board 20 of first RF apparatus 10A. In this instance, the air may flow about circuit board 20 and/or through circuit board 20, via the set of cooling apertures 20E, to cool and/or dissipate heat away from the circuit board 20 of the first RF apparatus 10A. In another instance, air may flow into third housing 6 and fourth housing 8 for cooling the circuit board 20 of second RF apparatus 10B. In this instance, the air may flow about circuit board 20 and through circuit board 20, via the set of cooling apertures 20E, to cool and/or dissipate heat away from the circuit board 20 of the second RF apparatus 10B.

Figure 7:
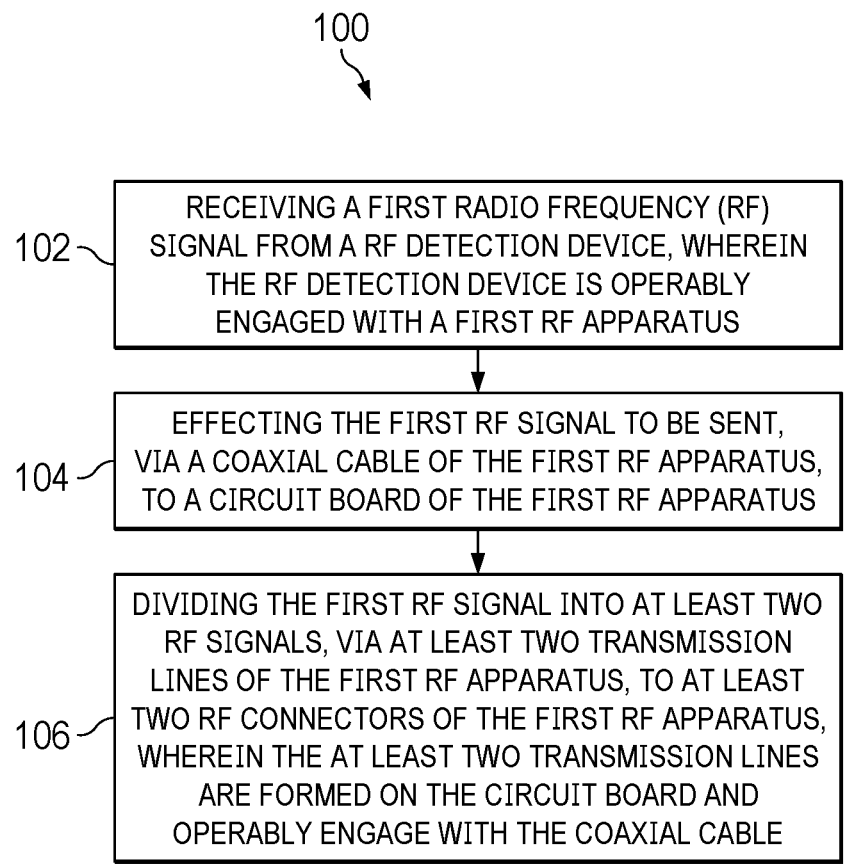
FIG. 7 is an exemplary method flowchart.

FIG. 7 illustrates a method 100. An initial step 102 of method 100 includes receiving a first radio frequency (RF) signal from a RF detection device, wherein the RF detection device is operably engaged with a first RF apparatus. Another step 104 of method 100 includes effecting the first RF signal to be sent, via a communication cable of the first RF apparatus, to a circuit board of the first RF apparatus. Another step 106 of method 100 includes dividing the first RF signal into at least two RF signals, via at least two transmission lines of the first RF apparatus, to at least two RF connectors of the first RF apparatus, wherein the at least two transmission lines are formed on the circuit board and operably engage with the communication cable.

In other exemplary embodiments, method 100 may include additional and/or optional steps. An optional step of method 100 may further include sending the first RF signal, via a bushing of the first RF apparatus, to the at least two transmission lines of the first RF apparatus; wherein the communication cable and the at least two transmission lines are electrical communication with one another via the bushing. Another optional step of method 100 may further include passing air through the circuit board, via a set of cooling apertures defined in the circuit board, for dissipating heat from at least the circuit board. Optional steps of method 100 may further include sending the at least two RF signals from the at least two RF connectors to at least another two RF connectors of a second RF apparatus; combining the at least two RF signals into a second RF signal by at least another two transmission lines of the second RF apparatus; and sending the second RF signal, via a communication cable of the second RF apparatus, to a RF output device. Another optional step of method 100 may further include amplifying the at least two RF signals from a first RF power level to a second RF power level greater than the first prior to combining the at least two RF signals into the second RF signal. Another optional step of method 100 may further include sending the at least two RF signals, via the at least another two RF connectors of the second RF apparatus, to a bushing of the second RF apparatus; wherein the communication cable of the second RF apparatus and the at least two transmission lines are electrical communication with one another via the bushing of the second RF apparatus.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A radio frequency (RF) apparatus, comprising:
   a circuit board having a first conductive surface forming an RF ground plane and a second conductive surface opposite to the first conductive surface;
   a communication cable operably engaged with the circuit board;
   at least two transmission lines formed on the second conductive surface of the circuit board and operably engaged with the communication cable; and
   at least two connectors operably engaged with the at least two transmission lines and operably engaged with the second conductive surface of the circuit board;
   wherein the RF apparatus is operable in a first configuration and a second configuration, wherein when in the first configuration, the RF apparatus is operable to divide a first RF signal into at least two RF signals, and wherein when in the second configuration, the RF apparatus is operable to combine the at least two RF signals into a second RF signal.

2. The RF apparatus of claim 1, further comprising:
   a first end of the communication cable; and
   a second end of the communication cable opposite to the first end;
   wherein when the RF apparatus is operable in the first configuration, the first RF signal divides into the at least two RF signals as the first RF signal is sent from the second end of the communication cable to the at least two transmission lines.

3. The RF apparatus of claim 1, further comprising:
   a first end of the communication cable; and
   a second end of the communication cable opposite to the first end;
   wherein when the RF apparatus is operable in the second configuration, the at least two RF signals combine into the second RF signal as the at least two RF signals are sent from the at least two transmission lines to the second end of the communication cable.

4. The RF apparatus of claim 1, further comprising:
   a bushing operably engaged with the circuit board, the communication cable, and the at least two transmission lines;
   wherein the bushing provides electrical communication between the communication cable and the at least two transmission lines; and
   wherein the bushing operably engages the communication cable with the circuit board.

5. The RF apparatus of claim 4, wherein each transmission line of the at least two transmission lines comprises:
   a first end operably engaged with the bushing; and
   a second end operably engaged with a connector of the at least two connectors.

6. The RF apparatus of claim 1, wherein the circuit board comprises:
   a central opening defined in the circuit board that extends between the first conductive surface and the second conductive surface;
   wherein a portion of the communication cable operably engages with the circuit board inside of the central opening.

7. The RF apparatus of claim 6, wherein the circuit board further comprises:
   a peripheral edge defined between the first conductive surface and the second conductive surface; and
   a set of cooling apertures defined in the circuit board that extends entirely through the circuit board;
   wherein the set of cooling apertures are defined between the central opening and the peripheral edge to enable air to flow through the circuit board.

8. The RF apparatus of claim 7, wherein the circuit board further comprises:
   a set of mounting holes defined in the circuit board that extends entirely through the circuit board;
   wherein the set of mounting holes are defined between the set of cooling apertures and the peripheral edge.

9. The RF apparatus of claim 4, wherein the communication cable comprises:
   an inner conductor operably engaged with the bushing;
   an outer conductor operably engaged with the circuit board; and
   a dielectric component operably engaged with and positioned between the inner conductor and the outer conductor;
   wherein each of the inner conductor and the dielectric component defines a tapered configuration.

10. The RF apparatus of claim 1, further comprising:
    a tubular member operably engaged with the circuit board;
    wherein the tubular member is configured to house the communication cable.

11. A radiofrequency (RF) power amplifier, comprising:
    a radial power divider configured to process a received RF input signal and divide the received RF input signal into at least two divided RF signals;
    an amplifier stage coupled to the at least two divided RF signals to amplify the at least two divided RF signals to a higher power level;
    a radial power combiner to combine amplified divided RF signals at the higher power level into an RF output signal;

wherein each of the radial power combiner and radial power divider comprises:
- a circuit board having a first conductive surface forming an RF ground plane and a second conductive surface opposite to the first conductive surface;
- a communication cable operably engaged with the circuit board;
- at least two transmission lines formed on the second conductive surface of the circuit board and operably engaged with the communication cable; and
- at least two connectors operably engaged with the at least two transmission lines and operably engaged with the second conductive surface of the circuit board.

12. The RF power amplifier of claim 11, wherein each of the radial power combiner and the radial power divider further comprises:
- a bushing operably engaged with the circuit board, the communication cable, and the at least two transmission lines;
- wherein the bushing provides electrical communication between the communication cable and the at least two transmission lines; and
- wherein the bushing operably engages the communication cable with the circuit board.

13. The RF apparatus of claim 12, wherein each of the radial power combiner and the radial power divider further comprises:
- a first end of each transmission line of the at least two transmission lines operably engaged with the bushing; and
- a second end of each transmission line of the at least two transmission lines operably engaged with a connector of the at least two connectors.

14. The RF apparatus of claim 11, wherein each of the radial power combiner and the radial power divider further comprises:
- a central opening defined in the circuit board that extends between the first conductive surface and the second conductive surface;
- a peripheral edge defined between the first conductive surface and the second conductive surface; and
- a set of cooling apertures defined in the circuit board that extends entirely through the circuit board;
- wherein a portion of the communication cable operably engages with the circuit board inside of the central opening;
- wherein the set of cooling apertures are defined between the central opening and the peripheral edge to enable air to flow through the circuit board.

15. A method, comprising:
- receiving a first radio frequency (RF) signal from a RF detection device, wherein the RF detection device is operably engaged with a first RF apparatus;
- effecting the first RF signal to be sent, via a communication cable of the first RF apparatus, to a circuit board of the first RF apparatus, wherein the circuit board includes a first conductive surface forming an RF ground plane and a second conductive surface opposite to the first conductive surface; and
- dividing the first RF signal into at least two RF signals, via at least two transmission lines of the first RF apparatus, to at least two RF connectors of the first RF apparatus, wherein the at least two transmission lines are formed on the second conductive surface of the circuit board and operably engage with the communication cable; and wherein the at least two RF connectors operably engage with the second conductive surface.

16. The method of claim 15, further comprising:
- sending the first RF signal, via a bushing of the first RF apparatus, to the at least two transmission lines of the first RF apparatus;
- wherein the communication cable and the at least two transmission lines are electrical communication with one another via the bushing.

17. The method of claim 15, further comprising:
- passing air through the circuit board, via a set of cooling apertures defined in the circuit board, for dissipating heat from at least the circuit board.

18. The method of claim 15, further comprising:
- sending the at least two RF signals from the at least two RF connectors to at least another two RF connectors of a second RF apparatus;
- combining the at least two RF signals into a second RF signal by at least another two transmission lines of the second RF apparatus; and
- sending the second RF signal, via a communication cable of the second RF apparatus, to a RF output device.

19. The method of claim 18, further comprising:
- amplifying the at least two RF signals from a first power level to a second power level greater than the first power level prior to combining the at least two RF signals into the second RF signal.

20. The method of claim 19, further comprising:
- sending the at least two RF signals, via the at least another two RF connectors of the second RF apparatus, to a bushing of the second RF apparatus;
- wherein the communication cable of the second RF apparatus and the at least two transmission lines are electrical communication with one another via the bushing of the second RF apparatus.

* * * * *